Patented Oct. 2, 1945

2,386,007

UNITED STATES PATENT OFFICE 2,386,007

PRODUCTION OF AROMATIC KETONES

Louis Schmerling and Vladimir N. Ipatieff, Chicago, Ill., assignors to Universal Oil Products Company, Chicago, Ill., a corporation of Delaware No Drawing. Application March 14, 1941,
Serial No. 383,363

15 Claims. (Cl. 260—591)

This invention relates to a process for producing an aromatic ketone by reacting an aromatic hydrocarbon with an organic acid chloride in the presence of a catalyst.

In one specific embodiment the present invention comprises a process for producing aromatic ketones which comprises subjecting aromatic hydrocarbons to contact with organic acid chlorides in the presence of a composite comprising essentially zinc chloride and an aluminum oxide-containing carrier.

The usual method for producing aromatic ketones, including aryl alkyl and di-aryl ketones, involves the reaction of an acyl or aroyl chloride with an aromatic hydrocarbon in the presence of aluminum chloride as catalyst. This process has the disadvantage that it must be carried out in batch type operation because the ketone produced forms an addition compound with the aluminum chloride catalyst which must be decomposed by hydrolysis to obtain the desired ketone. Thus for each molecular proportion of ketone obtained, 1 molecular proportion of aluminum chloride catalyst is consumed.

The present invention makes it possible to substantially avoid these disadvantages by using a supported zinc chloride catalyst which not only permits continuous operation but has the further important feature that substantially no complex addition compound is formed by the reaction of the desired ketones with the zinc chloride present in the catalyst.

The production of an aromatic ketone from an aromatic hydrocarbon and an acid chloride of an organic acid in the presence of a zinc chloride-containing catalyst may be illustrated by the following equation in which R represents an alkyl, naphthyl, or aryl radical of an organic acid and ArH represents an aromatic hydrocarbon:

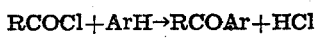
$$RCOCl + ArH \rightarrow RCOAr + HCl$$

Aromatic hydrocarbons such as benzene, toluene, other alkylated benzenes, naphthalene, alkylated naphthalenes, and other poly-nuclear aromatics which may be utilized in the production of aromatic ketones are obtainable by separation of the products derived from the distillation of coal, by the dehydrogenation of naphthenic hydrocarbons, and by the dehydrogenation of aliphatic hydrocarbons containing more than 5 carbon atoms per molecule in straight chain arrangement.

Substantially inert solvents or dispersing media as relatively high boiling paraffinic hydrocarbons may also be employed in the ketone-forming reaction, particularly when treating aromatic hydrocarbons which are normally solid at the chosen reaction temperature.

Acid chlorides used in the process of this invention are formed by the action of a phosphorus halide, as the trichloride, pentachloride, or oxychloride, upon the carboxylic acids or their salts. Organic acids which may be so converted into acid chlorides comprise those of the aliphatic, naphthenic, aromatic, and polycyclic series. Some other methods of producing acid chlorides comprise the action of chlorine upon aldehydes, the action of hydrogen chloride on a mixture of an acid nitrile and a carboxylic acid or an anhydride of a carboxylic acid, and by the action of phosphorus pentoxide upon a mixture of an aliphatic acid and hydrogen chloride.

The preferred catalyst for use in effecting the process of the present invention is a composite formed from zinc chloride and a carrier, preferably alumina or a material containing a substantial proportion of alumina. The different carriers which may be employed alternatively are not necessarily equivalent in their action.

The proportions of carrier and zinc chloride may be varied as desired to make catalyst composites of different activities. Thus it has been found possible and practical to make stable granular catalysts resistant to disintegrating influences by using from about 5 to about 50% by weight of zinc chloride and from about 95 to about 50% by weight of Activated Alumina. These materials in finely powdered form after thorough mechanical mixing may be subjected to drying, pelleting, and calcining operations to produce formed particles of catalyst suitable for use as reactor filling material through which the mixture of aromatic hydrocarbon and organic acid chloride may be passed to effect the formation of an aromatic ketone. Thus interaction of an aromatic hydrocarbon with an acyl chloride produces an aryl alkyl ketone while similar interaction of an aroyl chloride and an aromatic hydrocarbon produces a di-aryl ketone.

The catalyst compositions indicated in the specification and claims are shown in terms of the proportions of the materials from which the catalyst composites are prepared rather than the exact compositions of the composites which may be somewhat different due to formation of some zinc hydroxychloride, zinc oxychloride, or other material resulting from hydrolysis or partial hydrolysis of a portion of zinc chloride or to other conversions which are not clearly understood.

Reaction of organic acid chlorides with aromatic hydrocarbons may also be effected in the presence of hydrogen and/or hydrogen chloride. There is little or no carbon formation upon the zinc chloride-containing catalyst when ketones are so prepared under hydrogen pressure but formation of carbonaceous material upon the catalyst does occur to a substantial extent in the absence of hydrogen. A hydrogen halide and particularly hydrogen chloride introduced to the reaction mixture appears to exert a promoting effect upon the zinc chloride-containing catalyst.

In reacting aromatic hydrocarbons with acid chlorides of organic acids, according to the process of the present invention, the exact method of procedure varies with the different reactivities of the constituents. A simple procedure which is used in the case of aromatic hydrocarbons which are normally liquid, or readily soluble or easily dispersible in a substantially inert liquid and an acyl or aroyl chloride consists in contacting these reactants with a composite of zinc chloride and an aluminum oxide-containing carrier generally at a temperature of from about 100° to about 350° C. but preferably from about 150° to about 250° C. under a pressure of from substantially atmospheric to approximately 200 atmospheres. Intimate contact of the reacting components with the catalyst is effected in continuous type of operation by passing the reaction mixture through a fixed bed of the granular zinc chloride-containing catalyst or the reacting components may be mixed with finely divided catalyst in a substantially fluid type of operation. Batch type reaction may be carried out by mixing the reactants and catalyst in a closed vessel provided with adequate means of agitation, after which the products may be removed therefrom and separated. In the reaction mixture subjected to contact with the zinc chloride-containing catalyst it is preferable to have present between about 1 and about 20 molecular proportions of aromatic hydrocarbon per 1 molecular proportion of organic acid chloride.

In general the products formed by interaction of an acid chloride of an organic acid with a molal excess of an aromatic hydrocarbon are separated from the unreacted aromatic hydrocarbon by suitable means as by distillation, and the unreacted portion of the aromatic hydrocarbon is returned to the process and mixed with an additional quantity of the acid chloride and aromatic hydrocarbon being charged to contact with the zinc chloride-containing catalyst. The total reaction product thus freed from the excess of the originally charged aromatic hydrocarbon is separated into desired fractions by distillation at ordinary or reduced pressure or by other suitable means.

The following example is given to illustrate the character of the results obtained by the use of the present process, although the data presented are not introduced with the intention of unduly restricting the broad scope of the invention.

A mixture of 70 parts by weight of benzene, 30 parts by weight of benzoyl chloride, and 20 parts by weight of a composite formed from 25% by weight of zinc chloride and 75% by weight of alumina, was placed in an autoclave to which hydrogen was added to 100 atmospheres pressure and the commingled reaction mixture was then heated at 200° C. for 4 hours. After the reaction the mixture of resulting products, which was separated from the catalyst particles, was a dark oil consisting of a viscous lower layer and a more fluid upper layer. The mixture of reaction products was steam-distilled to remove unreacted benzene from a higher boiling oil containing a brown solid. The higher boiling oil was dissolved in alcohol and separated by filtration from sludge-like material. The addition of water to the filtrate containing the material dissolved in alcohol caused the precipitation of a yellow oil which solidified on standing and after recrystallization from hexane yielded crystalline benzophenone with a melting point of 49° C. The yield of benzophenone was 75% of the theoretical based upon the benzoyl chloride charged.

The nature of the present invention and its commercial utility can be seen from the specification and example given, although neither section is intended to limit its generally broad scope.

We claim as our invention:

1. A process for producing an aromatic ketone which comprises subjecting an aromatic hydrocarbon to contact with a carboxylic acid chloride in the presence of a catalyst formed by compositing zinc chloride and a carrier.

2. A process for producing an aromatic ketone which comprises subjecting an aromatic hydrocarbon to contact with a carboxylic acid chloride in the presence of a catalyst formed by compositing zinc chloride and an aluminum oxide-containing carrier.

3. A process for producing an aromatic ketone which comprises subjecting an aromatic hydrocarbon to contact with a carboxylic acid chloride at a temperature of from about 100° to about 350° C. in the presence of a catalyst formed by compositing zinc chloride and an aluminum oxide-containing carrier.

4. A process for producing an aromatic ketone which comprises subjecting an aromatic hydrocarbon to contact with a carboxylic acid chloride at a temperature of from about 100° to about 350° C. under a pressure of from substantially atmospheric to approximately 200 atmospheres in the presence of a catalyst formed by compositing zinc chloride and an aluminum oxide-containing carrier.

5. A process for producing an aromatic ketone which comprises subjecting an aromatic hydrocarbon to contact with a carboxylic acid chloride at a temperature of from about 100° to about 350° C. under a pressure of from substantially atmospheric to approximately 200 atmospheres in the presence of a catalyst formed by compositing zinc chloride and alumina.

6. A process for producing an aromatic ketone which comprises continuously and simultaneously subjecting an aromatic hydrocarbon, a carboxylic acid chloride, and hydrogen to contact at a temperature of from about 100° to about 350° C. in the presence of a catalyst formed by compositing zinc chloride and an aluminum oxide-containing carrier.

7. A process for producing an aromatic ketone which comprises continuously and simultaneously subjecting an aromatic hydrocarbon, a carboxylic acid chloride, and hydrogen to contact at a temperature of from about 100° to about 350° C. under a pressure of from substantially atmospheric to approximately 200 atmospheres in the presence of a catalyst formed by compositing from about 5 to about 50% by weight of zinc chloride and from about 95 to about 50% by weight of alumina.

8. A process for producing an alkyl aryl ketone which comprises continuously and simultaneously subjecting an aromatic hydrocarbon, an aliphatic carboxylic acid chloride, and hydrogen to contact at a temperature of from about 100° to about 350° C. under a pressure of from substantially atmospheric to approximately 200 atmospheres in the presence of a catalyst formed by compositing from about 5 to about 50% by weight of zinc chloride and from about 95 to about 50% by weight of alumina.

9. A process for producing a naphthyl aryl ketone which comprises continuously and simultaneously subjecting an aromatic hydrocarbon, a naphthenic carboxylic acid chloride, and hydrogen to contact at a temperature of from about 100° to about 350° C. under a pressure of from substantially atmospheric to approximately 200 atmospheres in the presence of a catalyst formed by compositing from about 5 to about 50% by weight of zinc chloride and from about 95 to about 50% by weight of alumina.

10. A process for producing a di-aryl ketone which comprises continuously and simultaneously subjecting an aromatic hydrocarbon, an aromatic carboxylic acid chloride, and hydrogen to contact at a temperature of from about 100° to about 350° C. under a pressure of from substantially atmospheric to approximately 200 atmospheres in the presence of a catalyst formed by compositing from about 5 to about 50% by weight of zinc chloride and from about 95 to about 50% by weight of alumina.

11. A process for producing benzophenone which comprises continuously and simultaneously subjecting benzene, benzoyl chloride, and hydrogen to contact at a temperature of from about 100° to about 350° C. under a pressure of from substantially atmospheric to approximately 200 atmospheres in the presence of a catalyst formed by compositing from about 5 to about 50% by weight of zinc chloride and from about 95 to about 50% by weight of alumina.

12. A process for the production of an aromatic ketone which comprises continuously subjecting a mixture of an aromatic hydrocarbon and a carboxylic acid chloride to contact with a catalyst comprising zinc chloride.

13. The process of claim 12 further characterized in that said carboxylic acid chloride comprises an aromatic carboxylic acid chloride.

14. The process of claim 12 further characterized in that said carboxylic acid chloride comprises a naphthenic carboxylic acid chloride.

15. The process of claim 12 further characterized in that said carboxylic acid chloride comprises an aliphatic carboxylic acid chloride.

LOUIS SCHMERLING.
VLADIMIR N. IPATIEFF.